Sept. 7, 1965  E. W. KLEINSORGE  3,204,788
ADJUSTABLE LOADING CONVEYOR DEVICE
FOR TRUCKS, WAGONS AND THE LIKE
Filed July 11, 1963  2 Sheets-Sheet 1

INVENTOR.
Earl W. Kleinsorge
BY John A. Hamilton
Attorney.

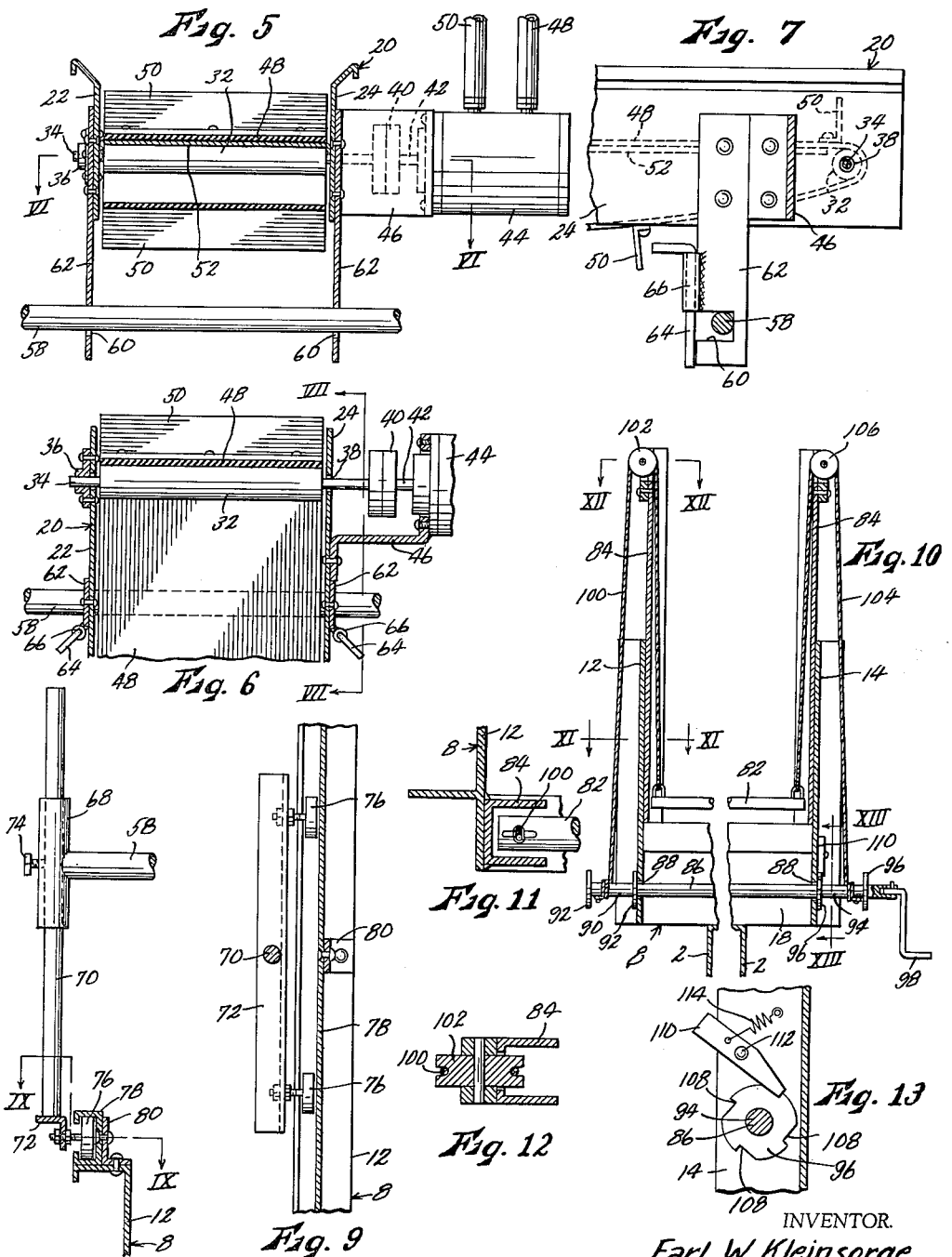

United States Patent Office 3,204,788
Patented Sept. 7, 1965

3,204,788
ADJUSTABLE LOADING CONVEYOR DEVICE
FOR TRUCKS, WAGONS AND THE LIKE
Earl W. Kleinsorge, Rte. 1, Cottonwood Falls, Kans.
Filed July 11, 1963, Ser. No. 294,399
1 Claim. (Cl. 214—83.26)

This invention relates to new and useful improvements in loading devices for trucks, wagons, and the like, and has as its principal object the provision of a loading device including an elongated conveyor adapted to receive material to be loaded at one end thereof and to discharge said material at its opposite end, and including novel means for supporting said conveyor relative to the truck or wagon bed whereby said material may be received at any elevation from closely adjacent the ground up to and even above the height of the wagon or truck bed, and discharged into any desired portion of said bed, whereby the loading operation may be carried out rapidly and conveniently and with a minimum of physical effort. To this end, the carriage means supporting the conveyor permits said conveyor to be shifted forwardly, rearwardly, and laterally with respect to the bed, and also to be tilted as may be desired. While the present device has been developed and designed primarily for use in connection with livestock feeds such as ensilage, it will be readily apparent that its usage is not thus restricted, but that it has general applicability for loading materials of many different types.

Other objects are simplicity and economy of construction, efficiency and dependability of operation, and adaptability for use in a wide variety of applications.

Figure 1:
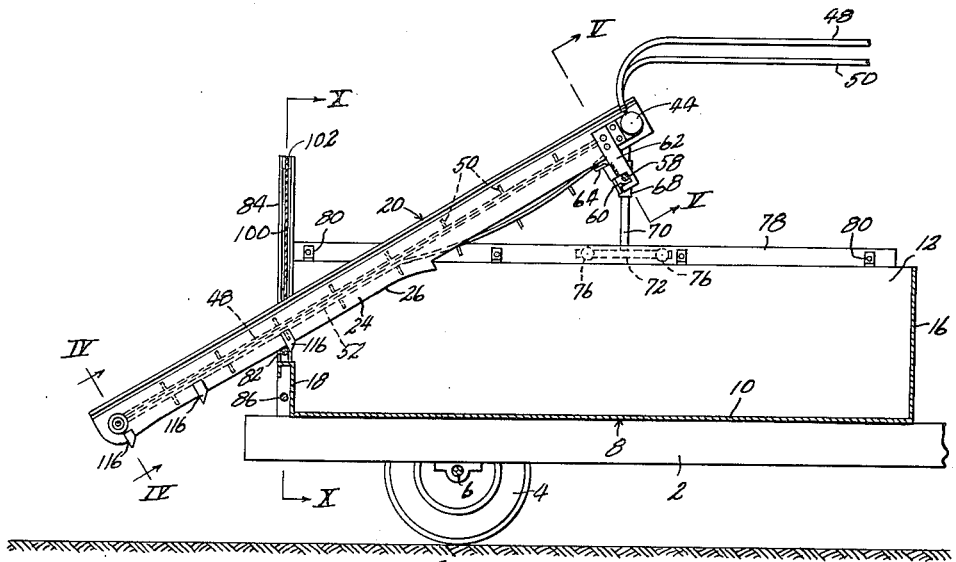
Figure 2:
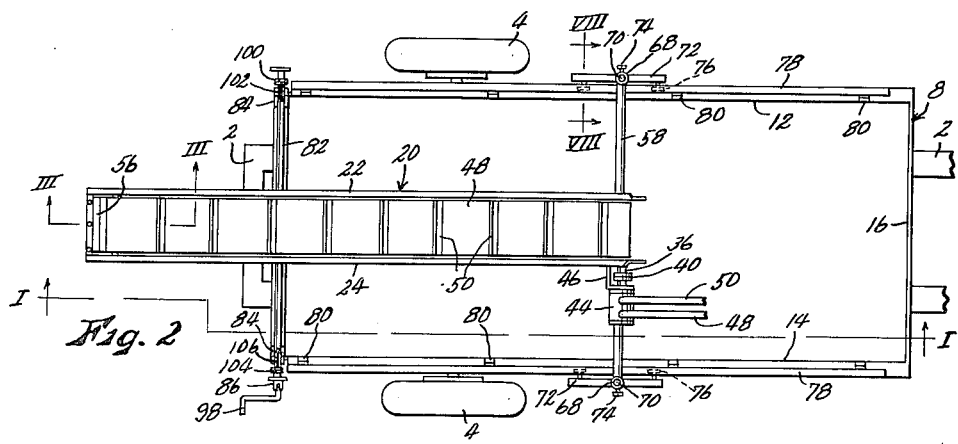
Figure 3:
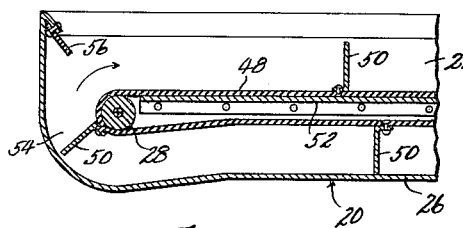
Figure 4:
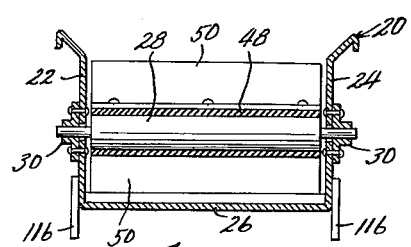

With these objects in view, as well as other objects which will appear in the course of the specification, reference will be had to the accompanying drawing, wherein:

FIG. 1 is a longitudinal vertical sectional view through the bed portion of a truck or wagon, taken on line I—I of FIG. 2, showing a loading device embodying the present invention operatively mounted therein, FIG. 2 is a top plan view of the parts as shown in FIG. 1, FIG. 3 is an enlarged fragmentary sectional view taken on line III—III of FIG. 2, FIG. 4 is an enlarged sectional view taken on line IV—IV of FIG. 1, FIG. 5 is an enlarged fragmentary sectional view taken on line V—V of FIG. 1, FIG. 6 is a fragmentary sectional view taken on line VI—VI of FIG. 5, FIG. 7 is a fragmentary sectional view taken on line VII—VII of FIG. 6, FIG. 8 is an enlarged fragmentary sectional view taken on line VIII—VIII of FIG. 2, FIG. 9 is a fragmentary sectional view taken on line IX—IX of FIG. 8, FIG. 10 is an enlarged sectional view taken on line X—X of FIG. 1, with parts broken out and foreshortened, FIG. 11 is an enlarged fragmentary sectional view taken on line XI—XI of FIG. 10, FIG. 12 is an enlarged fragmentary sectional view taken on line XII—XII of FIG. 10, and FIG. 13 is an enlarged fragmentary sectional view taken on line XIII—XIII of FIG. 10.

Like reference numerals apply to similar parts throughout the several views, and the numeral 2 applies to the frame or chassis, shown fragmentarily, of a farm truck or wagon, said frame being supported by ground-engaging wheels 4 carried by an axle 6, and in turn supporting a load-carrying bed 8 commonly having the form of a rectilinear box open at the top, and having a floor 10, side walls 12 and 14, front wall 16, and a rear wall 18 of abbreviated height.

The loading device includes an elongated conveyor indicated generally by the numeral 20 and adapted to extend forwardly and rearwardly over the top edge of rear wall 18 of the bed, so that its forward or discharge end is disposed above the bed and its rearward or intake end is disposed rearwardly of the bed. A belt-type conveyor is illustrated, although other types of conveyors, such as screw-type conveyors consisting of augers rotatable in tubes, could obviously be utilized if desired. As shown, conveyor 20 consists of an elongated sheet metal frame having vertically disposed side walls 22 and 24 connected at least at their rearward portions by a bottom wall 26. At the rearward end of the frame, a horizontal transverse roller 28 (see FIGS. 3 and 4), extends between side walls 22 and 24, being journalled in bearings 30 affixed to said side walls.

At the forward end of the conveyor frame, a second horizontal roller 32 (see FIGS. 5 and 6) extends transversely between side walls 22 and 24. The shaft 34 on which said roller is affixed is journalled at one end in a bearing 36 mounted on side wall 22. The other end of said shaft extends through a hole 38 provided therefor in side wall 24, and is connected by a coupling 40 to the output shaft 42 of a hydraulic motor 44. Said motor is affixed to a bracket 46 mounted rigidly on side wall 24, and is supplied with operating hydraulic fluid through a pair of flexible hoses 48 and 50 which connect with a hydraulic pump and valve controls, which may be driven by the engine of a truck, or by a tractor used to pull a wagon, but which are common and well known in the art and are not here shown. The flexibility of hoses 48 and 50 permits unrestrained movement of the conveyor, as will presently appear.

An endless conveyor belt 48 is trained about rollers 28 and 32, between side walls 22 and 24, and has a series of spaced apart cleats 50 attached to the outer surface thereof. The upper reach of said belt is supported by a sheet metal shelf member 52 which extends horizontally between and is affixed to side walls 22 and 24, and which extends longitudinally of the conveyor to points closely adjacent rollers 28 and 32. Bottom wall 26 of the conveyor frame, as best shown in FIG. 3, curves rearwardly and upwardly behind roller 28, whereby to form a well 54 for receiving and retaining material deposited at that end of the conveyor until a belt cleat 54 passes through the well to carry said material forwardly along the conveyor. A flap 56 of soft rubber or the like is secured to the upper rear edge of wall 26 and extends in close proximity to the orbit of cleats 50 as they pass about roller 28.

The forward end of a conveyor 20 is supported by a horizontal transverse carriage bar 58 engaged slidably and rotatably in a notch 60 formed in each of a pair of legs 62 affixed respectively to conveyor side walls 22 and 24 and extending downwardly therefrom. A keeper pin 64 slidably inserted in a tube 66 affixed to each of said legs normally closes the open side of notch 60 to prevent accidental dislodgment of the conveyor from bar 58. Each end of bar 58 is affixed to a vertical sleeve 68 mounted slidably on a vertical standard 70, said standards being disposed respectively at opposite sides of bed 8. Each standard is affixed at its lower end to an elongated angle-iron base 72 which is horizontal and extends forwardly and rearwardly from the associated standard. Sleeve 68 is adjustably secured on standard 70 by a set screw 74. Each of bases 72 carries a pair of roller wheels 76 journalled respectively at the opposite ends thereof, the axes of said roller wheels being horizontal and transverse to bed 8. Wheels 76, bases 72, standards 70, sleeves 68 and carriage bar 58 together constitute a front carriage. The wheels 76 of each base 72 are engaged movably in a track 78, said tracks extending horizontally along the upper edges of side walls 12 and 14 of bed 8, being secured thereto by brackets 80. As shown, said tracks consist of outwardly opening C-shaped channels extending virtually the full length of bed 8, so that the front carriage may be moved forwardly or rearwardly, but not upwardly or downwardly. The ends of the tracks are closed to prevent the carriage from leaving the ends of said tracks.

At the rearward end of bed 8, conveyor 20 is supported by a rear carriage bar 82 which is parallel to bar 58 and which engages bottom wall 26 of the conveyor frame, or the lower edges of side walls 22 and 24. The opposite end portions of bar 82 are confined for vertical movement only respectively in a pair of confronting vertical channel irons 84, said channel irons being welded or otherwise affixed respectively to the inner surfaces of bed side walls 12 and 14, and extending from the upper edge of rear bed wall 18 to points well above the upper edges of side walls 12 and 14. Below the upper edge of rear wall 18, and rearwardly therefrom, a horizontal transverse shaft 86 extends between and is journalled in holes 88 (see FIG. 10) provided therefor in side walls 12 and 14, said shaft extending outwardly from said side walls. The left extended end of said shaft, as viewed in FIG. 10, constitutes a cable drum 90 defined by a pair of flanges 92 affixed thereto. The right extended end of said shaft, as viewed in FIG. 10, constitutes a cable drum 94 defined by a pair of flanges 96 affixed thereto. The right end of the shaft is also provided with a crank 98 by means of which the shaft may be manually turned. A cable 100 is affixed to the left end of bar 82, extends upwardly therefrom through the associated channel 84, is trained over a pulley 102 journalled at the upper end of said channel, and then extends downwardly and is affixed to drum 90. A second cable 104 is affixed to the right end of bar 82, extends upwardly through the associated channel 84, is trained over a pulley 106 journalled at the upper end of said channel, and then extends downwardly and is affixed to drum 94.

It will be apparent that by turning shaft 86 by means of crank 98, carriage bar 82 may be elevated or lowered as desired, and this in turn elevates or lowers the rearward end of the conveyor by pivoting said conveyor vertically about forward carriage bar 58. In order to secure rear carriage bar 82 at any desired elevation, one of the flanges 96 defining drum 94 is peripherally notched at 108 (see FIG. 13), said notches being selectively engageable by a dog 110 pivoted to side wall 14 at 112 and urged into engagement with said notches by a spring 114. Said dog permits free rotation of shaft 86 in a direction causing elevation of carriage bar 82, but must be manually released to permit lowering of said carriage bar. In order to prevent the conveyor from sliding rearwardly on carriage bar 82 when said conveyor is relatively steeply inclined, a plurality of downwardly projecting stops 116 (see FIGS. 1 and 4) are affixed to the side walls 22 and 24 of the conveyor frame. Said stops, which are spaced apart longitudinally of the conveyor frame, and of which there may be any desired number, engage carriage bar 82 to prevent rearward movement of the conveyor. To move the conveyor rearwardly, the conveyor must be lifted to pass the stops 116 over bar 82.

The operation of the device is believed to be reasonably self-evident. By moving the front carriage forwardly or rearwardly along tracks 78, and by sliding the conveyor transversely of the bed along the carriage bars 58 and 82, the forward or discharge end of the conveyor may be disposed over any desired portion of bed 8, in order that said bed may be loaded uniformly with a minimum of effort. When the conveyor is moved rearwardly to discharge material into the rearmost part of bed 8, the rearward end of the conveyor may, if desired, be supported on a loading platform, on another vehicle, or on the ground, rather than on rear carriage bar 82. Also, set screws 74 may be loosened and sleeves 68 moved vertically on standards 70 to vary the elevation of the discharge end of the conveyor above bed 8, for greater convenience in loading the bed to different depths. At any position of the front carriage, when said conveyor is supported by rear carriage bar 82, the angle of inclination of the conveyor may be altered as desired by turning crank 98 to raise or lower said rear carriage bar. This pivots the conveyor on front carriage bar 58, and so raises or lowers the rearward end of the conveyor. This permits the conveyor to be loaded conveniently from the ground, or from another vehicle, or from a loading platform, as may be desired. When the rear carriage bar 82 is elevated in channels 84, boards or the like may be extended transversely across the bed with their end portions retained in said channels whereby effectively to increase the height of rear bed wall 18. The transport position of the conveyor is obtained by moving the front carriage to the forward ends of tracks 78, engaging the rearmost set of stops 116, which are directly beneath roller 28, with rear carriage bar 82, and elevating said rear carriage bar to its uppermost position. The conveyor is then disposed in a generally horizontal position directly above bed 8 and is locked against forward or rearward movement, so that the truck or wagon may be moved without danger of dislodging said conveyor.

While I have shown and described a specific embodiment of my invention, it will be readily apparent that many minor changes of structure and operation could be made without departing from the spirit of the invention as defined by the scope of the appended claim.

What I claim as new and desire to protect by Letters Patent is:

A loading device for use in combination with a vehicle having an upwardly opening load carrying bed, said loading device comprising:

(a) a pair of tracks adapted to be affixed respectively along the opposite sides of said bed to extend forwardly and rearwardly in parallel relation, (b) a pair of front carriage bases each disposed adjacent one of said tracks and having rollers operably engaged in said track, (c) a vertical standard affixed to and extending upwardly from each of said bases to points above said bed, (d) a horizontal front carriage bar extending transversely across said bed, (e) a vertical sleeve affixed to each end of said front carriage bar and being slidably engaged respectively on said standards, (f) releaseable means securing said sleeves against movement on said standards, (g) an elongated conveyor having its forward discharge end mounted pivotally on said front carriage bar for movement in a vertical plane and for transverse sliding movement along said bar, and having its rearward intake end disposed rearwardly of said bed, (h) means for driving said conveyor, (i) a horizontal rear carriage bar extending transversely across said bed at the rearward end thereof, said conveyor resting intermediate its ends on said rear carriage bar for vertical rocking movement relative thereto and for transverse sliding movement therealong, and (j) means for mounting said rear carriage bar on said bed and operable to move said rear carriage bar vertically with respect to said bed.

(References on following page)

References Cited by the Examiner

UNITED STATES PATENTS

| | | | |
|---|---|---|---|
| 1,224,834 | 5/17 | Kaukaine | 198—233 |
| 1,488,858 | 4/24 | Arndt | 198—204 |
| 2,219,533 | 10/40 | Ross | 214—83.36 |
| 2,389,759 | 11/45 | Blank et al. | 198—20.5 |
| 2,410,996 | 11/46 | Patterson | 214—521 |
| 2,515,966 | 7/50 | Polisena | 198—233 |
| 2,584,361 | 2/52 | Morine | 214—521 |
| 2,599,838 | 6/52 | Kandoll | 198—123 X |
| 3,090,515 | 5/63 | Crowther | 214—83.36 X |

FOREIGN PATENTS 595,543  7/59  Italy.

HUGO O. SCHULZ, *Primary Examiner.*
MORRIS TEMIN, *Examiner.*